Patented July 16, 1929.

1,721,188

UNITED STATES PATENT OFFICE.

HUGH S. REID AND AYLMER H. MAUDE, OF SHAWINIGAN FALLS, QUEBEC, CANADA, ASSIGNORS TO CANADIAN ELECTRO PRODUCTS COMPANY, OF SHAWINIGAN FALLS, CANADA.

MANUFACTURE OF MERCURY SALTS.

No Drawing. Application filed April 18, 1921. Serial No. 462,347.

This invention relates to improvements in the manufacture of salts of mercury, such as the chlorides and sulphates, and the object of the invention is to provide a process by which the salts and particularly the sulphates may be manufactured economically and at a lower temperature than has been hitherto possible.

A further object is to provide a process particularly adaptable to manufacturing salts of mercury from waste products, such as the mercury sludge remaining from the manufacture of acetaldehyde from water and acetylene gas using a mercury salt as catalyst.

The accepted process for the manufacture of sulphates of mercury consists in heating metallic mercury with concentrated sulphuric acid, the mercury or the acid being in excess according as a mercuric or mercurous sulphate is desired. The temperature necessary to effect the combination ranges from 190° C. to 210° C. In practice, it is found that a pure sulphate can not be obtained as a mixture of the mercuric and mercurous sulphates is obtained under all conditions so that separation is necessary. The high temperature necessitates either direct firing or heating by the circulation of high boiling petroleum. The disadvantages of such a process are first that considerable mercury is lost by volatilization and, secondly, that a great health hazard is incurred when working with mercury at such high temperatures.

According to the present invention, sulphates of mercury can be readily made at relatively low temperatures, namely, between 20° C. and 80° C. by the use of sulphuric acid, preferably diluted, providing there is added to the reaction a small amount of a suitable catalytic agent such as nitric acid, nitrous acid, an acid forming oxide of nitrogen or a nitrate or nitrite which in the presence of sulphuric acid converts to nitric or nitrous acid respectively. The nitric acid serves more or less in a catalytic capacity. During the reaction nitric oxide is liberated. By suitably supplying oxygen or air to the reaction at atmospheric or super-atmospheric pressure, the nitric oxide is oxidized to nitrogen peroxide and this peroxide under the conditions outlined changes to nitric acid. Using nitrous acid the operation will be similar. Theoretically, the amount of acid remains unchanged but in practice it is found that a small amount is lost in the form of oxides of nitrogen which escape.

When introducing the catalyst in the form of an oxide it is first dissolved in the sulphuric acid. During the reaction NO fumes are given off and mixed with air or oxygen to oxidize the NO to $NO_2$ and the fumes are absorbed in sulphuric acid, thus preparing for the next batch. The sulphuric acid may contain up to 12% $NO_2$ in solution.

Other salts of mercury such as mercurous chloride may be made in substantially the same manner as the sulphates by using hydrochloric acid instead of sulphuric acid.

It has been found that when using small amounts of nitric acid, that is under .5%, the reaction is very feeble if the sulphuric acid is greatly diluted. Thus, while the reaction proceeds at any concentration of sulphuric acid, it is not as commercially efficient as desirable with less than 25% sulphuric acid, but the rate of reaction increases steadily with the percentage, reaching a maximum efficiency with about 80% sulphuric acid and the rate then decreasing. The commercially effective range is from 50% to 90% concentration and for the greatest efficiency between 75% and 85%.

It has also been found that the process is most successfully carried out and best results obtained using sulphuric acid of high concentration, together with a small amount of nitric or nitrous acid. In practice, therefore, the process is carried out with acid of 75% to 85% concentration and preferably near 85% concentration using at any instant only traces of nitric or nitrous acid. This will be appreciated from an examination of the following examples. If lower concentrations of sulphuric acid are used the amount of nitric acid must be increased and therefore for economical reasons, it is advisable to use the higher concentrations of sulphuric acid. If a low concentration of sulphuric acid is used comparatively large amounts of nitric or nitrous acid are required, that is to say, amounts over .5%.

Nitric or nitrous acid is introduced slowly and continuously throughout the duration of the reaction or through substantially the whole duration unless very low sulphuric concentrations are used which permit the addition of the nitric acid all at one time. With the more highly concentrated sulphuric acid it is inadvisable to add the nitric acid except in very small quantities, since, if any considerable amount is added the reaction becomes so violent that it is very difficult or impossible to control it.

The following examples will serve to illustrate the invention:—

Example I.

275 lbs. of metallic mercury is placed in a vessel and 400 lbs. of 85% sulphuric acid and 40 lbs. of water added. To this there is added gradually during two to four hours, approximately 7 lbs. of sodium nitrate or approximately the same weight of 72% nitric acid. On the addition of the nitrate or nitric acid the reaction commences and proceeds vigorously, the temperature maintaining between 40° C. and 60° C. Air is continuously passed through the acid conveniently by circulating a portion of the acid through an absorption tower, into the base of which air is blown. The same result may be obtained by blowing air through the acid in the reaction vessel but when this is done there is a certain loss of nitric acid due to nitric oxide being carried away by the escaping air. At the end of from three to four hours it will be found that the mercury is completely converted into mercurous sulphate and a very small amount of mercuric sulphate. There remains of the 400 lbs. of 85% acid used, about 380 lbs. of 80% acid of which about 310 lbs. may be immediately recovered by sedimentation and is available for re-use, approximately 70 lbs. being mixed with the sulphate.

In carrying out the process according to this example the amount of sulphuric acid used may be reduced to 275 lbs. if desired, the amount of water being proportionally reduced.

Example II.

The process may be carried out as in Example I except that no tower is used and oxygen is blown into the reaction mixture to oxidize the nitric oxide to nitrogen peroxide.

The invention is particularly applicable to the recovery of mercury from a process such as the manufacture of acetaldehyde, in which the mercury is not obtained as a metallic regulus but as a finely divided precipitate containing impurities such as complex mercury organic compounds. For the recovery of mercury from such material, the sludge is first settled and the liquid removed by decantation, leaving a moist mercury sludge.

Example III.

500 lbs. of mercury sludge as above, containing approximately 275 lbs. mercury, is placed in a vessel and 500 lbs. to 644 lbs. of 85% sulphuric acid added, the amount of acid depending on the composition of the sludge. No water is added for the reason that the sludge already contains from 15% to 25% of water. Sodium nitrate or nitric acid is added as in Example I, the amount varying from 11 lbs. to 17 lbs. according to the composition of the sludge. The temperature is maintained at approximately 50° by the heat of reaction and the results obtained are substantially as in Example I. The sludge frequently contains a certain amount of impurity which gives off sulphur dioxide and this acts to reduce the nitric oxide. It may therefore be advisable when working with the sludge to add the sulphuric acid to the sludge before introduction of the nitric acid, so that the sulphur dioxide is largely driven off at the commencement and the reduction of nitric acid minimized to a considerable extent.

Example IV.

5 kilos of mercury sludge containing approximately 50% mercury and 25% water is placed in a suitable vessel and 1.2 kilos of 94% sulphuric acid added. Sodium nitrate is added from time to time, the total amount ranging between 75 grms. and 115 grms. Oxygen under a pressure of approximately 2 atmospheres absolute is passed into the reaction vessel. According to this example, the use of an absorption tower is eliminated and the amount of acid is greatly reduced as compared with previous examples.

Example V.

5 kilos of sludge, containing 50% mercury and 25% water, is placed in reaction vessel and 1.2 kilos of 94% sulphuric acid containing $NO_2$ in solution up to 12% is added slowly during the course of reaction. The oxides of nitrogen evolved are drawn off together with a good supply of air and passed through 94% sulphuric acid. This acid absorbs all the nitric oxide and is used over again for the next charge.

For reasons of economy, it is advisable to add nitric acid to the reaction in the form of sodium nitrate, but for the sake of convenience nitric acid may be used as it may be easily added a little at a time as the reaction proceeds.

The present process presents advantages which will be readily appreciated. The temperature is low enough so that very little volatilization of the mercury occurs and the health of the operators is little, if any, affected. The comparatively low temperatures of the reaction are easily maintained by the heat of reaction itself, so that no external heating is necessary. The vigor of the reaction and therefore the heat thereof may be controlled by the rate of addition of the nitric acid. It will be seen from the foregoing examples that a smaller amount of nitric acid will suffice when using metallic mercury. When mercuric sulphate is desired, greater amounts of sulphuric and nitric acids are used than given in the examples. It will also be found that when the process is operating smoothly a somewhat less amount of sulphuric acid than specified may be used without affecting the results.

The body essential to the success of the present invention is nitric or nitrous acid, which for the purposes of this invention are equivalents, and it is to a large extent immaterial in what manner the acid is introduced. The acid may be introduced as such or as an acid-forming oxide or as a suitable salt, which in presence of the sulphuric acid liberates the desired catalytic agent. It will therefore be understood that the addition of acid-forming nitrogen oxides and suitable salts is the full equivalent of adding nitric or nitrous acid. In the case of the manufacture of sulphates the acid salts of sulphuric acid may be used instead of the normal acid. The terms "sulphuric acid" and "hydrochloric acid" must also be held to include either pure concentrated acid or any dilution thereof or an acid sulphate. The reaction proceeds at any temperature from ordinary room temperature upward and with any concentration of acid but, with weak acid solutions, the reaction approaches efficiency only when comparatively high temperatures are maintained. It is also necessary when working with weak acid solutions to employ larger amounts of catalyst in order to expedite the reaction, especially if the temperature is low. As the temperature of the reaction is maintained ordinarily by the heat of reaction and as the vigor of the reaction depends upon the amount of catalyst, it will be seen that the temperature may be regulated by judicious additions of the catalytic agent.

Having thus described our invention, what we claim is:—

1. A process of making salts of mercury, which comprises bringing together metallic mercury and a strong nonoxidizing mineral acid in presence of nitric acid while maintaining a temperature between 20° and 80° C.

2. A process of making salts of mercury, which comprises bringing together metallic mercury and a strong nonoxidizing mineral acid in presence of nitric acid, and supplying oxygen to regenerate nitric acid while maintaining a temperature between 20° and 80° C.

3. A process of making a sulphate of mercury, which comprises bringing together mercury and sulphuric acid of over 60% concentration in presence of nitric acid.

4. A process of making a sulphate of mercury, which comprises bringing together mercury and sulphuric acid of 75% to 85% concentration in presence at any instant of traces only of nitric acid.

5. A process of making a mercury sulphate which comprises bringing together metallic mercury and sulphuric acid in presence of nitric acid at a temperature between 20° and 80° C.

6. A process of making a mercury sulphate, which comprises bringing together metallic mercury and sulphuric acid in presence of nitric acid at a temperature between 20° and 80° C., and supplying oxygen to the reaction mixture during the reaction to regenerate nitric acid.

7. A process of making a mercury sulphate, which comprises bringing together metallic mercury and sulphuric acid, adding a nitric acid forming body, and supplying oxygen to the reaction mixture to regenerate nitric acid during the reaction, while maintaining a temperature between 20° and 80° C.

8. A process of making a sulphate of mercury, which comprises bringing together mercury and sulphuric acid of over 60% concentration in presence of nitric acid, while maintaining a temperature under 80° C.

9. A process of making salts of mercury, which comprises bringing together metallic mercury and a strong non-oxidizing mineral acid in presence of nitric acid while maintaining a temperature under 80° C.

10. A process of making a mercury sulphate, which comprises bringing together metallic mercury and sulphuric acid in presence of nitric acid at a temperature under 80° C.

11. A process of making a sulphate of mercury, which comprises bringing together metallic mercury and sulphuric acid of 75% to 85% concentration in presence of a small amount of nitric acid.

12. A process of making a sulphate of mercury, which comprises bringing together metallic mercury and sulphuric acid of a concentration over 60% and under 90% in presence of nitric acid.

In witness whereof, we have hereunto set our hands.

HUGH S. REID.
AYLMER H. MAUDE.